United States Patent Office.

LUDWIG SELL, OF PASING, GERMANY, ASSIGNOR TO APOTHEKER LUDWIG SELL & CO., OF SAME PLACE.

SALIGENIN COMPOUND AND PROCESS OF MAKING SAME.

SPECIFICATION forming part of Letters Patent No. 630,522, dated August 8, 1899.

Application filed July 12, 1898. Serial No. 685,740. (Specimens.)

*To all whom it may concern:*

Be it known that I, LUDWIG SELL, apothecary, a subject of the King of Bavaria, residing at Pasing, (Munich,) Bavaria, Germany, have invented certain new and useful Improvements in the Manufacture of a new Preparation from Saligenin; and I do hereby declare the following to be a full, clear, and exact description of the invention, such as will enable others skilled in the art to which it appertains to make and use the same.

This invention relates to a new preparation from saligenin—that is, orthohydroxybenzyl alcohol or orthoöxybenzyl alcohol ($C_7H_8O_2$)—capable of being used for medicinal purposes, more especially in the treatment of uric-acid diathesis. Experiments have shown that an effective product of this kind can be made by the aid of saligenin if the latter is combined in a suitable manner with physiological tanning principles, substances, or materials or with tannic acid separated therefrom.

The term "physiological tanning principle, substance, or material" is used in this specification to signify such tanning principles as do not furnish or are not converted into gallic acid on boiling with dilute acids. The tanning principles or substances which under normal conditions occur as such in the plants are known, and since these tanning principles are the natural product of the normal conditions of life of the plants it seems to be proper to call these tanning principles by the signification "physiological tanning principles" in contradistinction to such tanning principles as occur in parts abnormally formed by the plants—as, for instance, in consequence of a morbid action or the like—a common illustration being the ordinary gall-nuts. Tanning principles obtained from such abnormal plant organizations may be called "pathological tanning principles." Ordinary gallic acid [trioxybenzoic acid $(OH)_3C_6H_2CO$ OH or $C_7H_6O_5$] separates from gallotannic acid ($C_{14}H_{10}O_9$) by treating the same with dilute acid. The gallotannic acid is found in abnormal or pathological organizations or concretions occurring on oaks and can be considered to be "bigallic" acid, ($C_{14}H_{10}O_9$.) On the other hand, the tanning principles which form under normal conditions of the plant itself and which I have termed "physiological tanning principles" do not produce on being heated with dilute acid the ordinary gallic acid, but the corresponding tannic acid—as, for instance, querci-tannic acid from the tanning principle of oak-bark or quino-tannic acid from cinchona-bark.

The physiological tanning principles or substances hereinabove referred to when digested in alcoholic aqueous solutions with mineral acids are partly hydrolized and converted into phlobaphenes, and that salicin when digested in aqueous solution with dilute mineral acid is converted into saligenin, and that, finally, for both transformations a temperature of 90° centigrade is necessary. It appears, moreover, that if physiological tanning materials and salicin be allowed to act on each other in the presence of dilute mineral acid—for example, a five-per-cent. solution of hydrochloric acid at 90° centigrade—a new condensation product is obtained which has a greater medicinal effect than salicin, especially in cases of uric-acid diathesis. Since the salicin, as stated, is split up by dilute mineral acid at about 90° centigrade, giving saligenin, the same result is obtained if instead of salicin ready-prepared saligenin be employed. Of the physiological tanning materials oak-bark, cinchona-bark, and chestnut tanning material may here be mentioned as examples, which on heating with dilute mineral acid give no gallic acid, and therefore are applicable for the purposes of this invention. On the basis of these experiments the desired product can be obtained in the manner hereinafter described.

One part, by weight, of a physiological tanning material—that is to say, a tanning material which gives no gallic acid with dilute acid—is heated with twenty parts, by weight, of five per cent. hydrochloric acid at 90° centigrade until the tanning material is split up into tannic acid and glucose. 3.8 parts, by weight, of salicin are then added thereto and the mixture further heated until the saligenin reaction takes place. There then separates out a brown resin-like substance which has been formed from the tannic acid and saligenin, and in the residual colorless solution there is contained saligenin, glucose, hydrochloric acid, and undecomposed salicin. So long as free tannic acid can be detected in the mixture no saligenin reaction takes place. When, on the contrary, saligenin can be detected, there is no longer any free tannic reaction. It is necessary that salicin or saligenin be employed in excess, and when employing one part, by weight, of tanning material and 3.8 parts, by weight, of salicin about seventy per cent. of the new substance is obtained. This product is formed when employing any desired physiological tanning material or the corresponding tannic acid. It is insoluble in water, slightly soluble in benzene, ether, petroleum-benzin, petroleum-ether, or dilute acids, partially soluble in acetone, easily soluble in alcohol (with a Bordeaux-red color) in wood-spirit and fifty per cent. acetic acid, from which solutions the substance can be reprecipitated by means of water unchanged. The substance is also easily soluble in alkalies, from which solutions it is reprecipitated on neutralization with acids without change. Concentrated sulfuric acid dissolves the substance with a yellowish-brown color. On the addition of concentrated nitric acid this color is clearer. By adding bichromate of potassium a tinge of red is imparted to the solution. Concentrated nitric acid dissolves it only with difficulty with a yellow color, while concentrated hydrochloric acid is almost without action thereon. The solution of the substance in concentrated sulfuric acid gives on dilution with water a clear yellow solution, which assumes a clear brown color on supersaturation with alkalies. The substance takes the form of a snuff-colored or chocolate-brown powder, with an extremely slight aromatic smell, calling to mind jalap-resin, with a not particularly characteristic weak resin-like taste. It melts with decomposition and emission of acid-vapors, smelling like jalap-resin, which condense to an oily brown liquid. On platinum sheet the substance burns without melting and without leaving behind any residue. It is soluble in ammonia and caustic alkalies with a dark-brown color. This ammoniacal solution gives with silver nitrate in the first place a greenish-blue fluorescence and after warming and standing a silver mirror. In the acetic-acid solution silver nitrate produces a brown precipitate. The substance reduces Fehling's solution very strongly. The alcoholic solution of the substance is not acted upon by iron chlorid, and consequently gives neither a tannic acid nor a saligenin reaction. If, however, the alcoholic solution diluted with water be warmed for a long time, a filtrate is obtained from the liquid, (which becomes cloudy on cooling,) and this filtrate gives a greenish-black coloration or precipitate with iron chlorid.

The product can be obtained pure in the manner above described, for which purpose it is entirely separated by decantation of the solution, which contains glucose, hydrochloric acid, salicin, and saligenin, and can be collected on a filter, and thus easily separated from the excess of the substances employed and the other decomposition products—for example, glucose and saligenin.

The new product can also be made in concentrated solution, for which purpose after the reaction is complete the hot fairly-concentrated solution is placed on one side to cool. A brownish amorphous-crystalline substance then separates out, which for the greater part contains the new product, but also various substances crystallizing out therewith—such as salicin, saligenin, &c.—which were either employed or formed in the process.

For the manufacture of the new preparation those tanning materials which give gallic acid on heating with acids cannot be employed—such, for example, as tannin, (gallotannic acid.) The latter product when used as above mentioned gives a reaction product which contains a great part of the tannin unaltered and which in contradistinction to the reaction products obtained from the physiological tanning materials is soluble to a considerable extent in hot water and in ether.

The product obtained by the process of the present invention by bringing what I term "physiological tannic acid" into contact with saligenin (as such or in the form of its glycosid "salicin") and heating the mixture in the presence of a dilute acid, such as hydrochloric acid, is "tannic-acid oxybenzylether," no matter whether one or another of the physiological tannic acids has been employed for the reaction. In all cases the same product of reaction will be formed—namely, tannic-acid oxybenzylether.

I find that the proper way to administer the remedy is at the rate of from six to eight grams per day in individual doses of one gram each. In some cases it will also be efficient to administer the same from three to four times per day in doses of five-tenths of a gram each, continuing the same for about a week. The remedy has been given practically in the form of pills.

Having now particularly described my invention, what I claim as new therein, and desire to secure by Letters Patent, is—

1. The manufacture of a new preparation of saligenin by bringing saligenin in contact with a physiological tannic acid to react upon each other in the presence of a dilute acid at an elevated temperature, as and for the purpose set forth.

2. A new preparation from saligenin and tannic acid forming a brownish solid substance, having a slightly-aromatic smell, being insoluble in water, slightly soluble in benzene, ether, petroleum-benzin, petroleum-ether, dilute acids, partially soluble in acetone, easily soluble in alcohol with a Bordeaux-red color, in wood-spirit, and in fifty per cent. acetic acid, from which solutions the product can be precipitated by addition of water unchanged, and the said substances being also easily soluble in alkalies, from which solution it is precipitated without change on neutralization with acid, all substantially as described.

In testimony that I claim the foregoing as my invention I have signed my name in presence of two subscribing witnesses.

LUDWIG SELL.

Witnesses:
HARRY BELMONT,
K. KIRCHMAYER.